US009996740B2

(12) United States Patent
Oka et al.

(10) Patent No.: US 9,996,740 B2
(45) Date of Patent: Jun. 12, 2018

(54) INFORMATION PROCESSING DEVICE, INFORMATION PROCESSING METHOD, PROGRAM, AND INFORMATION STORAGE MEDIUM

(71) Applicant: SONY COMPUTER ENTERTAINMENT INC., Tokyo (JP)

(72) Inventors: Masaaki Oka, Kanagawa (JP); Teiji Yutaka, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 132 days.

(21) Appl. No.: 15/022,342

(22) PCT Filed: Sep. 29, 2014

(86) PCT No.: PCT/JP2014/075852
§ 371 (c)(1),
(2) Date: Mar. 16, 2016

(87) PCT Pub. No.: WO2015/046500
PCT Pub. Date: Apr. 2, 2015

(65) Prior Publication Data
US 2016/0300104 A1    Oct. 13, 2016

(30) Foreign Application Priority Data
Sep. 30, 2013 (JP) ................. 2013-205042

(51) Int. Cl.
G06K 9/46        (2006.01)
G06K 9/66        (2006.01)
(Continued)

(52) U.S. Cl.
CPC .......... G06K 9/00355 (2013.01); G06F 3/01 (2013.01); G06K 9/4604 (2013.01); H04N 5/225 (2013.01); H04N 5/23219 (2013.01)

(58) Field of Classification Search
CPC .... G06F 3/01; G06K 9/00355; G06K 9/4604; H04N 5/225; H04N 5/23219
See application file for complete search history.

(56) References Cited

U.S. PATENT DOCUMENTS

| 6,256,400 | B1  | 7/2001 | Takata et al. |
| 2005/0157908 | A1 | 7/2005 | Matsugu et al. |
| 2015/0201123 | A1* | 7/2015 | Koguchi ............ H04N 5/23212 348/239 |

FOREIGN PATENT DOCUMENTS

| JP | 2000-172163 A | 6/2000 |
| JP | 2005-202653 A | 7/2005 |

OTHER PUBLICATIONS

International Search Report and Written Opinion dated Dec. 22, 2014, from the corresponding PCT/JP2014/075852.
(Continued)

Primary Examiner — Phuoc Tran
(74) Attorney, Agent, or Firm — Katten Muchin Rosenman LLP

(57) ABSTRACT

The present invention is to provide an information processing device, an information processing method, a program, and an information storage medium with which the accuracy of detection of whether the contact of an object with a subject is present or absent is improved compared with conventional techniques. A frame image acquiring section (32) acquires plural frame images that include a subject region in which an image of a subject appears and are taken at timings different from each other. A subject partial region identifying section (38) identifies, about each of the frame images, plural subject partial regions that are each part of the subject region and are different from each other in the position in the subject region. A partial region feature identifying section (40) identifies partial region features showing variation in an image feature of an image occupy-
(Continued)

ing the subject partial region on the basis of the image feature of the image occupying each of the subject partial regions associated with each other in each of the frame images. A contact determining section (42) determines whether the contact of an object with the subject is present or absent on the basis of a relationship among the partial region features each associated with a respective one of plural subject partial regions.

8 Claims, 12 Drawing Sheets

(51) Int. Cl.
    *G06K 9/00*     (2006.01)
    *G06F 3/01*     (2006.01)
    *H04N 5/225*     (2006.01)
    *H04N 5/232*     (2006.01)

(56) References Cited

OTHER PUBLICATIONS

Akira Saito, "Tanpatsuon o Riyo shita Hand Gesture Interaction", IPSJ SIG Notes 2012 (Heisei 24) Nendo 6 [DVD-ROM], Apr. 15, 2013 (Apr. 15, 2013) (See English translation of International Search Report and Written Opinion dated Dec. 22, 2014, from the corresponding PCT/JP2014/075852).

\* cited by examiner

FIG.5

| SR0 | SR1 | SR2 | SR3 |
| SR4 | SR5 | SR6 | SR7 |
| SR8 | SR9 | SR10 | SR11 |
| SR12 | SR13 | SR14 | SR15 |

| IDENTIFICATION NUMBER | IMAGE CONTACT DETERMINATION CONDITION |
|---|---|
| 0 | PRC0>PRC1, PRC0>PRC2, PRC0>PRC3, PRC0>PRC9, PRC0>PRC10, PRC0>PRC11, PRC0>PRC13, PRC0>PRC14, PRC0>PRC15, PRC1>PRC2, PRC3>PRC2 |
| 3 | PRC3>PRC0, PRC3>PRC1, PRC3>PRC2, PRC3>PRC8, PRC3>PRC9, PRC3>PRC10, PRC3>PRC12, PRC3>PRC13, PRC3>PRC14, PRC0>PRC1, PRC2>PRC1 |

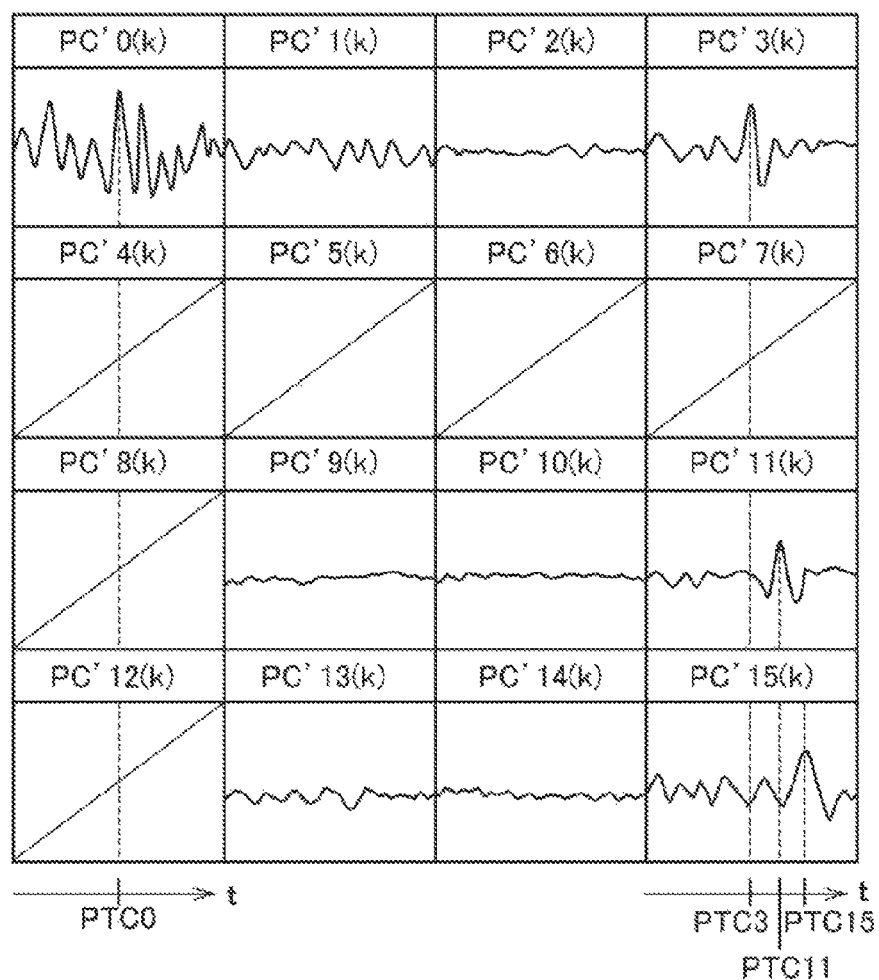

INFORMATION PROCESSING DEVICE, INFORMATION PROCESSING METHOD, PROGRAM, AND INFORMATION STORAGE MEDIUM

TECHNICAL FIELD

The present invention relates to an information processing device, an information processing method, a program, and an information storage medium.

BACKGROUND ART

An information processing device that uses an image obtained by imaging a subject as an input interface exists. As one example of such an information processing device, an information processing device exists that identifies the motion of a subject on the basis of difference among plural frame images taken at timings different from each other and executes processing according to this motion.

SUMMARY

Technical Problem

For example, it is convenient that a user can carry out input to an information processing device by bringing a finger into contact with the face. However, in the conventional technique in which an image obtained by imaging a subject is used as an input interface, the accuracy of detection of whether the contact of an object with the subject is present or absent is low. Therefore, it is difficult to discriminate between a situation in which a user actually brings a finger into contact with the face and a situation in which the user pretends to bring a finger into contact with the face.

The present invention is made in view of the above problem and one of objects thereof is to provide an information processing device, an information processing method, a program, and an information storage medium with which the accuracy of detection of whether the contact of an object with a subject is present or absent is improved compared with conventional techniques.

Solution to Problem

In order to solve the above problem, an information processing device according to the present invention is characterized by including a frame image acquiring section configured to acquire a plurality of frame images that include a subject region in which an image of a subject appears and are taken at timings different from each other, a subject partial region identifying section configured to identify, about each of the frame images, a plurality of subject partial regions that are each part of the subject region and are different from each other in the position in the subject region, a partial region feature identifying section configured to identify partial region features showing variation in an image feature of an image occupying the subject partial region on the basis of the image feature of the image occupying each of the subject partial regions associated with each other in each of the frame images, and a contact determining section configured to determine whether contact of an object with the subject is present or absent on the basis of a relationship among the partial region features each associated with a respective one of a plurality of the subject partial regions.

Furthermore, an information processing method according to the present invention is characterized by including a step of acquiring a plurality of frame images that include a subject region in which an image of a subject appears and are taken at timings different from each other, a step of identifying, about each of the frame images, a plurality of subject partial regions that are each part of the subject region and are different from each other in the position in the subject region, a step of identifying partial region features showing variation in an image feature of an image occupying the subject partial region on the basis of the image feature of the image occupying each of the subject partial regions associated with each other in each of the frame images, and a step of determining whether contact of an object with the subject is present or absent on the basis of a relationship among the partial region features each associated with a respective one of a plurality of the subject partial regions.

Moreover, a program according to the present invention is characterized by causing a computer to execute a procedure of acquiring a plurality of frame images that include a subject region in which an image of a subject appears and are taken at timings different from each other, a procedure of identifying, about each of the frame images, a plurality of subject partial regions that are each part of the subject region and are different from each other in the position in the subject region, a procedure of identifying partial region features showing variation in an image feature of an image occupying the subject partial region on the basis of the image feature of the image occupying each of the subject partial regions associated with each other in each of the frame images, and a procedure of determining whether contact of an object with the subject is present or absent on the basis of a relationship among the partial region features each associated with a respective one of a plurality of the subject partial regions.

In addition, an information storage medium according to the present invention is a computer-readable information storage medium that stores a program characterized by causing a computer to execute a procedure of acquiring a plurality of frame images that include a subject region in which an image of a subject appears and are taken at timings different from each other, a procedure of identifying, about each of the frame images, a plurality of subject partial regions that are each part of the subject region and are different from each other in the position in the subject region, a procedure of identifying partial region features showing variation in an image feature of an image occupying the subject partial region on the basis of the image feature of the image occupying each of the subject partial regions associated with each other in each of the frame images, and a procedure of determining whether contact of an object with the subject is present or absent on the basis of a relationship among the partial region features each associated with a respective one of a plurality of the subject partial regions.

The inventor of the present invention has found that the relationship among the partial region features showing variation in the image feature of the images occupying plural subject partial regions about these subject partial regions differs between a situation in which an object actually gets contact with a subject and a situation in which a user pretends to bring an object into contact with the subject. Furthermore, in the present invention, it is determined whether the contact of an object with a subject is present or absent on the basis of the relationship among the partial region features each associated with a respective one of plural subject partial regions. Thus, according to the present invention, the accuracy of detection of whether the contact of an object with a subject is present or absent is improved compared with conventional techniques.

In one aspect of the present invention, the contact determining section determines whether contact of an object with part of the subject appearing in the image occupying the subject partial region is present or absent on the basis of a relationship that is associated with the subject partial region and is a relationship among the partial region features each associated with a respective one of a plurality of the subject partial regions.

In this aspect, the contact determining section may determine whether contact of an object with part of the subject appearing in the image occupying the subject partial region different from a plurality of the subject partial regions is present or absent on the basis of a relationship among the partial region features each associated with a respective one of the plurality of the subject partial regions.

Furthermore, in one aspect of the present invention, the contact determining section determines whether contact of an object with the subject is present or absent on the basis of a magnitude relationship among the degrees of variation in the image feature shown by the partial region features each associated with a respective one of a plurality of the subject partial regions.

Moreover, in one aspect of the present invention, the contact determining section determines whether contact of an object with the subject is present or absent on the basis of a temporal anteroposterior relationship about change in the image feature shown by the partial region feature associated with each of a plurality of the subject partial regions.

In addition, in one aspect of the present invention, the information processing device further includes a sound data acquiring section that acquires sound data and the contact determining section determines whether contact of an object with the subject is present or absent on the basis of the relationship among the partial region features and the sound data that is acquired.

BRIEF DESCRIPTION OF DRAWINGS

FIG. 5 is a diagram showing one example of the relationship between a subject region and subject partial regions.

FIG. 7 is a diagram showing one example of image contact determination condition data.

FIG. 14 is a diagram schematically showing one example of the post-filtering image features about plural subject partial regions.

DESCRIPTION OF EMBODIMENT

One embodiment of the present invention will be described in detail below on the basis of the drawings.

Figure 1:
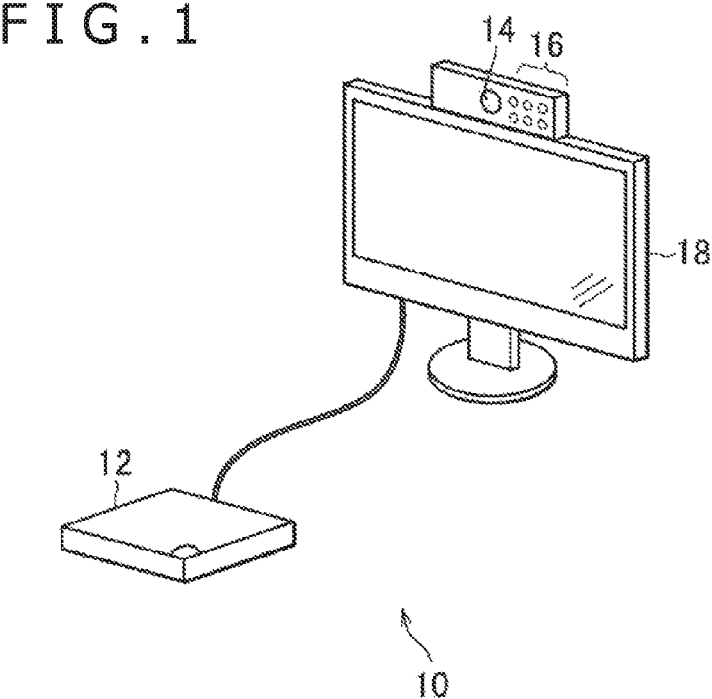
FIG. 1 is a diagram showing one example of the whole configuration of an information processing system according to one embodiment of the present invention.

FIG. 1 is a diagram showing one example of the whole configuration of an information processing system 10 according to one embodiment of the present invention. As shown in FIG. 1, the information processing system 10 according to the present embodiment includes an information processing device 12, an imaging device 14, a sound collecting device 16, and a display device 18 for example. The information processing device 12 according to the present embodiment is a computer such as a game console for example. The imaging device 14 is a camera that outputs an image obtained by imaging a subject to the information processing device 12. The sound collecting device 16 is a microphone or the like that acquires ambient sounds and converts these sounds to sound data of the PCM format or the like to output the sound data to the information processing device 12. The display device 18 is a liquid crystal display or the like and displays a screen generated by the information processing device 12, an image taken by the imaging device 14, and so forth. The information processing device 12 is connected to the imaging device 14 and the sound collecting device 16 via a USB cable, an AV cable, an HDMI (registered trademark) (High-Definition Multimedia Interface) cable, or the like for example. The information processing device 12 is connected to the display device 18 via an AV cable, an HDMI cable, or the like for example.

In the present embodiment, the imaging device 14 sequentially takes images of a subject disposed in front of the imaging device 14 at a predetermined frame rate. Hereinafter, these images will be referred to as frame images 20 (see FIG. 2A, FIG. 2B, and FIG. 2C). Furthermore, suppose that the subject in the present embodiment is the face of a user. Suppose that the frame rate in the present embodiment is 60 fps. That is, the frame period in the present embodiment is 1/60 seconds.

Figure 2A:
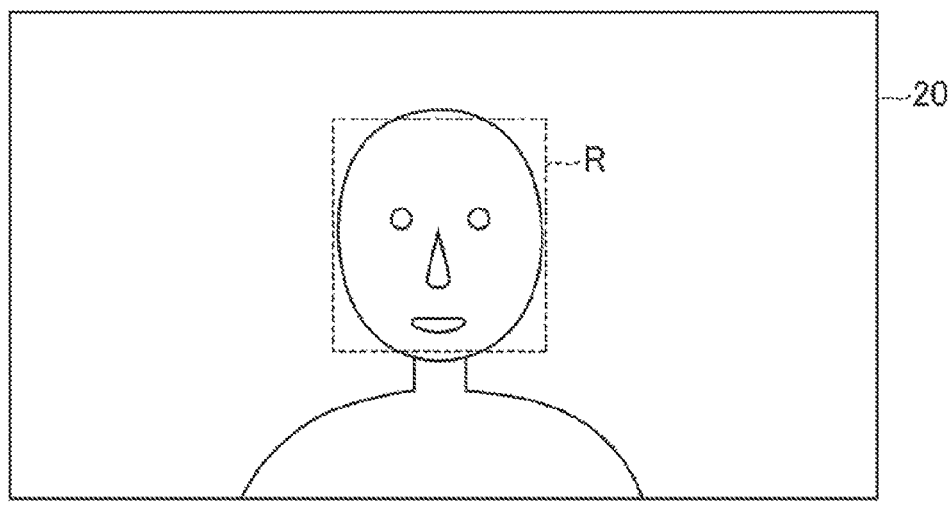
FIG. 2A is a diagram showing one example of a frame image.
Figure 2B:
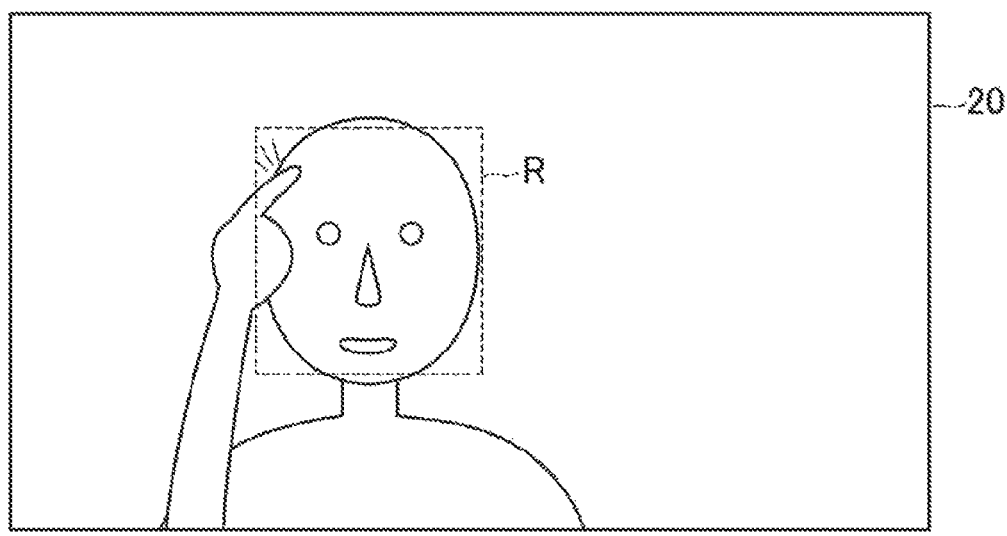
FIG. 2B is a diagram showing one example of the frame image.
Figure 2C:
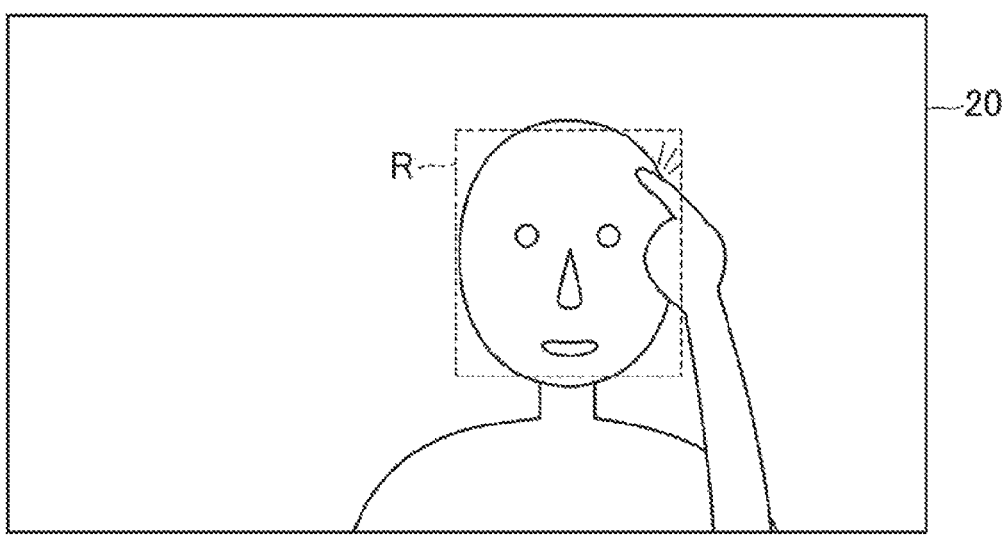
FIG. 2C is a diagram showing one example of the frame image.

FIG. 2A, FIG. 2B, and FIG. 2C are each a diagram showing one example of the frame image 20 taken by the imaging device 14. Suppose that, in the present embodiment, a finger of a user is brought into contact with the face at the timing when the frame image 20 shown in FIG. 2B is taken and at the timing when the frame image 20 shown in FIG. 2C is taken.

Figure 3:
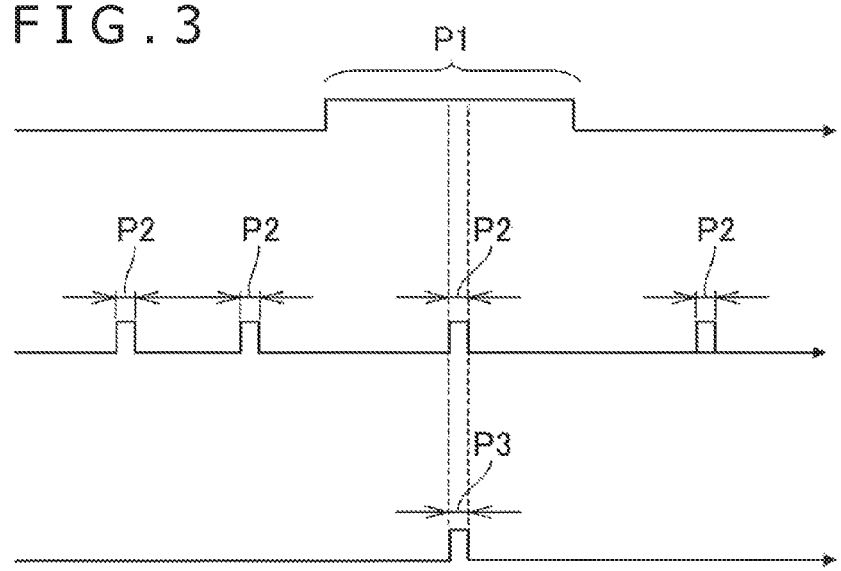
FIG. 3 is a diagram showing one example of the relationship among an image contact determination period about which it is determined that an image contact determination condition is satisfied, a sound contact determination period about which it is determined that a sound contact determination condition is satisfied, and a period finally identified as a period in which the contact of an object with a subject is present.

In the present embodiment, whether the contact of an object with a subject is present or absent is determined on the basis of the frame images 20 taken by the imaging device 14 and sounds acquired by the sound collecting device 16. For example, in the present embodiment, about each of plural image contact determination periods set in advance, it is determined whether or not the frame images 20 taken in the image contact determination period satisfy an image contact determination condition (see FIG. 7) to be described later. Furthermore, in the present embodiment, about each of plural sound contact determination periods set in advance, it is determined whether or not sounds acquired in the sound contact determination period satisfy a sound contact determination condition to be described later. In FIG. 3, one example of an image contact determination period P1 about which it is determined that the image contact determination condition is satisfied and sound contact determination periods P2 about which it is determined that the sound contact determination condition is satisfied is shown. Furthermore, in the present embodiment, a period P3 during which the image contact determination period P1 and the sound contact determination period P2 overlap is identified. Then, this period P3 is finally identified as a period in which the contact of an object with the subject is present. For example, about a period in which the timing when the frame image 20 shown in FIG. 2B is taken is included and a period in which the timing when the frame image 20 shown in FIG. 2C is taken is included, it is determined that an object has gotten contact with the subject.

Figure 4:
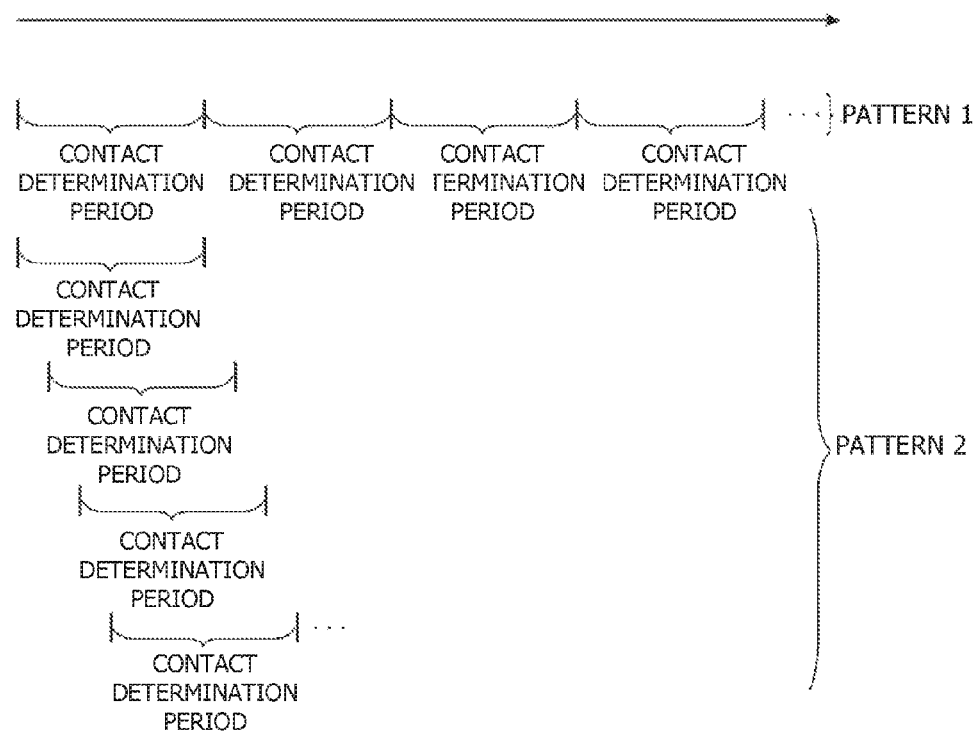
FIG. 4 is an explanatory diagram for explaining a setting pattern example of contact determination periods.

FIG. 4 is an explanatory diagram for explaining a setting pattern example of the image contact determination period and the sound contact determination period (in FIG. 4, represented as contact determination period). The image contact determination periods and the sound contact determination periods may be set at predefined time intervals as shown in pattern 1 in FIG. 4 or may be so set as to partly overlap with each other as shown in pattern 2 in FIG. 4 for example. Suppose that, in the present embodiment, the image contact determination periods are set at an interval of e.g. 64 frames, i.e. about one second, as shown in pattern 1 in FIG. 4. Furthermore, suppose that frame numbers are set for the frame images 20 from 1 to 64 in order in accordance with the order of imaging in the image contact determination period in the present embodiment. In addition, suppose that the sound contact determination periods are set at an interval of one millisecond as shown in pattern 1 in FIG. 4 in the present embodiment. In this manner, the image contact determination periods and the sound contact determination periods are independently set in the present embodiment.

Hereinafter, a region in which a subject appears in the frame image 20 will be referred to as a subject region R. As shown in FIG. 2A to FIG. 2C, an image of the face of a user is substantially included in the image occupying the subject region R in the present embodiment. In the present embodiment, the positions of the user when the frame images 20 shown in FIG. 2A to FIG. 2C are taken are different from each other. Therefore, the positions of the figure of the subject in the frame images 20 shown in FIG. 2A to FIG. 2C are different from each other. Furthermore, in the present embodiment, the distance between the user and the imaging device 14 is shorter when the frame image 20 shown in FIG. 2B is taken and when the frame image 20 shown in FIG. 2C is taken than when the frame image 20 shown in FIG. 2A is taken. Therefore, the figure of the subject is captured as a larger figure in the frame image 20 shown in FIG. 2B and the frame image 20 shown in FIG. 2C than in the frame image 20 shown in FIG. 2A. That is, the ratios of the subject region R to the frame images 20 shown in FIG. 2B and FIG. 2C are higher than the ratio of the subject region R to the frame image 20 shown in FIG. 2A.

The inventor has found that variation in the image feature of the image occupying the subject region R in the image contact determination period differs between a situation in which a user actually brings a finger into contact with the face in this image contact determination period and a situation in which the user pretends to bring a finger into contact with the face in this image contact determination period. With attention focused on this, in the present embodiment, it is determined whether or not an object has actually gotten contact with a subject as described below.

In the present embodiment, the subject region R is divided into plural subject partial regions SR (see FIG. 5). FIG. 5 is a diagram showing one example of the relationship between the subject region R and the subject partial regions SR. As shown in FIG. 5, the subject partial region SR is a region occupying part of the subject region R. Furthermore, the positions, in the subject region R, of the subject partial regions SR included in the one subject region R are different from each other. In the present embodiment, the subject region R is equally divided into vertical four×horizontal four, i.e. total 16, subject partial regions SR.

In the present embodiment, identification numbers are allocated to the subject partial regions SR. In the present embodiment, identification numbers of 0 to 3, 4 to 7, 8 to 11, and 12 to 15 are allocated to the subject partial regions SR on the top row, the second row from the top, the third row from the top, and the bottom row, respectively, in order from the left. In the present embodiment, the subject partial region SR to which an identification number i is allocated is expressed as SRi as shown in FIG. 5. In the present embodiment, the identification number is associated with the position in the subject region R. In the present embodiment, the allocation of the identification numbers to the subject partial regions SR does not depend on the frame image 20. That is, irrespective of the frame image 20, for example the subject partial region SR at the upper left end in the subject region R is the subject partial region SR0.

When it is determined that the contact of an object with a subject is present, the information processing device 12 according to the present embodiment executes processing according to this contact. Furthermore, in the present embodiment, identification of the subject partial region SR associated with the contact position of the object is also carried out. In the example of FIG. 2B, the subject partial region SR associated with the contact position of the finger is identified as SR0. In the example of FIG. 2C, the subject partial region SR associated with the contact position of the finger is identified as SR3. Furthermore, when it is determined that the contact of an object with a subject is present, the information processing device 12 according to the present embodiment executes processing according to the subject partial region SR associated with the position of the contact of the object with the subject. The processing executed according to the contact of the object with the subject is not particularly limited. For example, activation processing of a program installed in the information processing device 12, stop processing of the information processing device 12, execution processing of a command in a program under execution in the information processing device 12, and so forth correspond to this processing. For example, if the subject partial region SR associated with the contact position of the object is the subject partial region SR0, the information processing device 12 executes the activation processing of the program installed in the information processing device 12. Furthermore, for example, if the subject partial region SR associated with the contact position of the object is the subject partial region SR3, the information processing device 12 executes the stop processing of the information processing device 12. In this manner, in the information processing system 10 according to the present embodiment, input of information to the information processing device 12 by bringing an object into contact with a subject is enabled.

In the following, a description will be made mainly about processing of determination of whether the contact of an object with a subject is present or absent.

Figure 6:
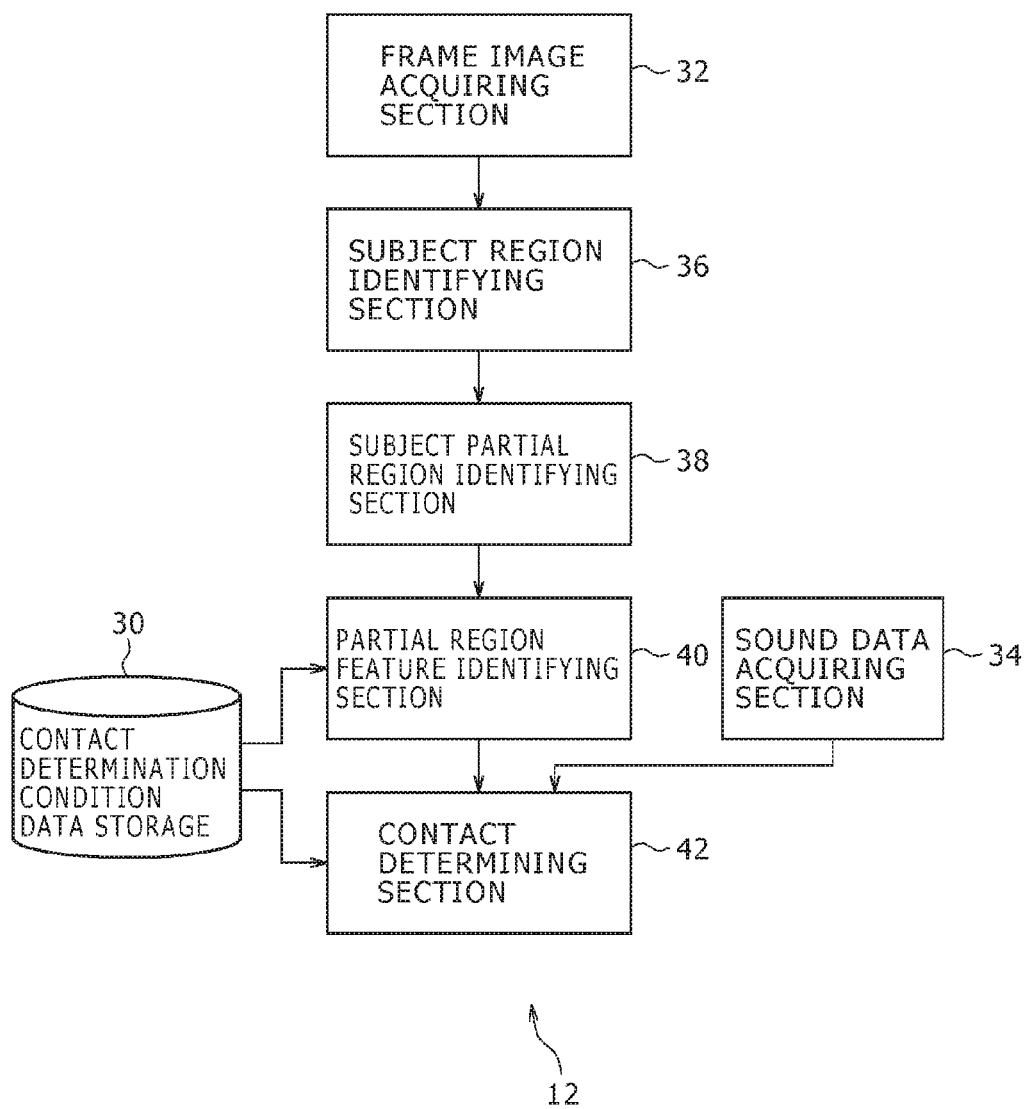
FIG. 6 is a functional block diagram showing one example of functions implemented by an information processing device according to one embodiment of the present invention.

FIG. 6 is a functional block diagram showing one example of functions implemented in the information processing device 12 according to the present embodiment. In the information processing device 12 according to the present embodiment, all of the functions shown in FIG. 6 do not need to be implemented and a function other than the functions shown in FIG. 6 may be implemented.

The information processing device 12 according to the present embodiment includes a control unit that is a program control device such as a CPU that operates in accordance with a program installed in the information processing device 12. Furthermore, the information processing device 12 also includes storage elements such as a ROM and a RAM and a storage unit such as a hard disk drive. In the storage unit of the information processing device 12, programs to be executed by the control unit of the information processing device 12 and so forth are stored. Furthermore, the information processing device 12 includes a USB (Universal Serial Bus) port, an HDMI port, and so forth.

Moreover, as shown in FIG. 6, the information processing device 12 according to the present embodiment functionally includes a contact determination condition data storage 30, a frame image acquiring section 32, a sound data acquiring section 34, a subject region identifying section 36, a subject partial region identifying section 38, a partial region feature identifying section 40, and a contact determining section 42 for example. The contact determination condition data storage 30 is implemented based mainly on the storage unit of the information processing device 12. The other functions are implemented mainly on the basis of the control unit of the information processing device 12.

Furthermore, the above functions are implemented by executing a program that is installed in the information processing device 12 as a computer and includes commands corresponding to the above functions by the control unit of the information processing device 12. This program is supplied to the information processing device 12 via a computer-readable information storage medium such as an optical disc, a magnetic disc, a magnetic tape, a magnetooptical disc, or a flash memory or via communication means such as the Internet for example.

The contact determination condition data storage 30 stores contact determination condition data showing a condition with which it is determined whether the contact of an object with a subject is present or absent. In the present embodiment, in the contact determination condition data storage 30, image contact determination condition data showing a condition with which it is determined whether the contact of an object with a subject is present or absent on the basis of the frame images 20 is stored as one example of the contact determination condition data. Furthermore, in the contact determination condition data storage 30, sound contact determination condition data showing a condition with which it is determined whether the contact of an object with a subject is present or absent on the basis of acquired sounds is also stored. In the sound contact determination condition data, e.g. the range of the frequency region and the magnitude of the sound volume are shown as the condition.

In FIG. 7, one example of the image contact determination condition data is shown. In the image contact determination condition data, for example the identification numbers associated with the positions in the subject region R and image contact determination conditions relating to a partial region feature PRC identified on the basis of the image occupying the subject partial region SR associated with the identification number are included. In this manner, in the image contact determination condition data, the identification number and the image contact determination condition are associated. In the image contact determination condition data shown in FIG. 7, only the image contact determination conditions associated with identification numbers 0 and 3 are clearly shown. However, suppose that the image contact determination conditions associated with identification numbers 1, 2 and 4 to 15 are shown in this image contact determination condition data similarly. The image contact determination condition associated with the identification number 0 is used when it is determined whether the contact of an object with part of a subject appearing in the image occupying the subject partial region SR0 is present or absent. The image contact determination condition associated with the identification number 3 is used when it is determined whether the contact of an object with part of a subject appearing in the image occupying the subject partial region SR3 is present or absent. Furthermore, as shown in FIG. 7, plural conditions are associated with the identification number as the image contact determination condition in the present embodiment. In addition, the image contact determination condition in the present embodiment is equivalent to the logical product of these plural conditions. In the present embodiment, if the partial region feature PRCi to be described later satisfies all of the plural conditions associated with the identification number i, it is determined that an object has gotten contact with part of a subject appearing in the image occupying the subject partial region SRi.

The frame image acquiring section 32 acquires the frame images 20 taken by the imaging device 14. In the present embodiment, the frame image acquiring section 32 acquires the frame images 20 at an interval of $1/60$ seconds.

The sound data acquiring section 34 acquires sound data from the sound collecting device 16 for example. In the present embodiment, the sound data acquiring section 34 holds the acquired sound data until at least the end of the contact determination period to which the timing when the corresponding sound is acquired belongs.

The subject region identifying section 36 identifies the subject region R in the frame image 20. In the present embodiment, the subject region identifying section 36 identifies the subject region R in which an image of the face of a user is captured by a tracking technique such as a publicly-known face recognition technique for example. A configuration may be employed in which the subject region R in the frame image 20 is set in advance and the user adjusts the position of the face so that the image of the face of the user may be captured in the subject region R.

The subject partial region identifying section 38 identifies the subject partial region SR on the basis of the subject region R. In the present embodiment, for example, the subject partial region identifying section 38 equally divides the subject region R into vertical four regions and horizontal four regions to thereby identify 16 subject partial regions SR (SR0 to SR15) different from each other in the position in the subject region R about each frame image 20.

The partial region feature identifying section 40 identifies the partial region feature PRC showing variation in the image feature of the image occupying the subject partial region SR. Here, the image feature of the image occupying the subject partial region SR refers to statistical information or the like according to the pixel value of the pixels in this image for example. As one example of this statistical information, the average pixel value of the pixels in the relevant image is cited. In the present embodiment, the partial region feature identifying section 40 identifies the partial region feature PRCi (i=0, 1, 2, . . . , 15) associated with the subject partial region SRi. As above, in the present embodiment, the partial region feature PRC is identified about each of the identification numbers allocated to the subject partial regions SR. In the present embodiment, the partial region feature identifying section 40 identifies a larger value as the partial region feature PRCi in the contact determination period when variation in the image feature of the image occupying the subject partial region SRi in this contact determination period is larger. Although it is assumed that the partial region feature PRCi is a scalar in the present embodiment, the partial region feature PRCi may be a vector. Furthermore, the partial region feature identifying section 40 may carry out the identification only about the partial region features PRCi shown as the image contact determination condition.

The contact determining section 42 determines whether the contact of an object with a subject is present or absent on the basis of at least one of the relationship among the partial region features PRC0 to PRC15 associated with plural positions and sound data acquired by the sound data acquiring section 34. In the present embodiment, about each subject partial region SR, the contact determining section 42 determines whether or not an object has gotten contact with part of a subject appearing in the image occupying the region.

Figure 8:
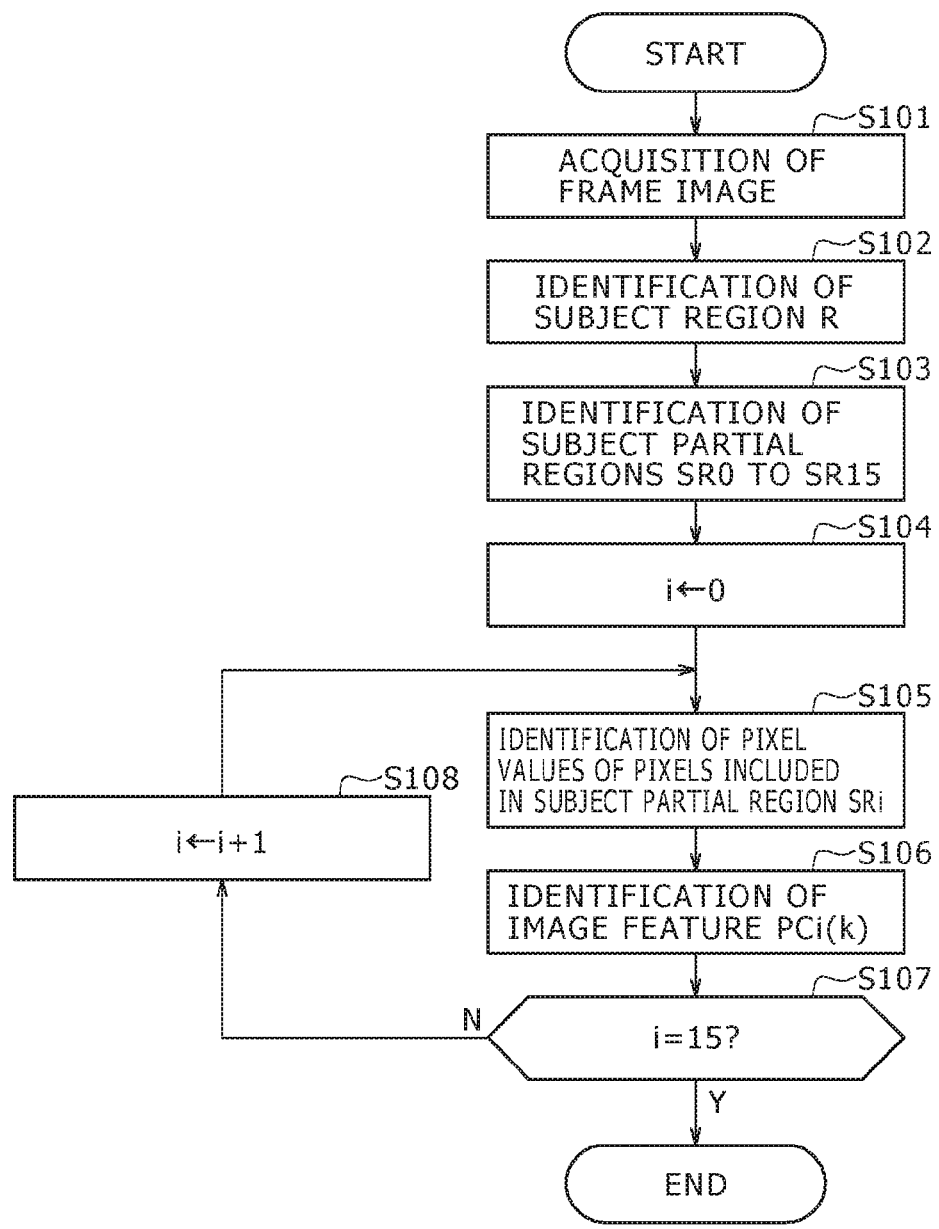
FIG. 8 is a flow diagram showing one example of the flow of processing executed in the information processing device according to the present embodiment.

Here, one example of the flow of processing executed in the information processing device 12 according to the present embodiment in each frame period will be described with reference to a flow diagram shown in FIG. 8.

First, the frame image acquiring section 32 acquires the frame image 20 (S101). Here, suppose that the frame image 20 whose frame number is k is acquired. Then, the subject region identifying section 36 identifies the subject region R in the frame image 20 acquired in the processing shown in S101 (S102). Then, the subject partial region identifying section 38 divides the subject region R identified in the processing shown in S102 into 16 regions to identity 16 subject partial regions SR (SR0 to SR15) (S103).

Then, the partial region feature identifying section 40 sets the value of the variable i to 0 (S104). Then, the partial region feature identifying section 40 identifies the pixel values of the pixels included in the subject partial region SRi (S105). In the processing shown in S105, the partial region feature identifying section 40 identifies the R-component pixel value, the G-component pixel value, and the B-component pixel value of all pixels included in the subject partial region SR0 for example.

Then, the partial region feature identifying section 40 identifies an image feature PCi(k) according to the pixel values identified in the processing shown in S105 (S106). In the present embodiment, the partial region feature identifying section 40 holds data showing the image feature PCi(k) identified in the processing shown in S106 until the end of the contact determination period to which the relevant frame period belongs.

In the processing shown in S106, for example, the partial region feature identifying section 40 identifies a three-dimensional vector whose components are the average value of each of the R component, the G component, and the B component of the pixel value of the pixels included in the subject partial region SRi in the frame image 20 of the frame number k. Then, the partial region feature identifying section 40 identifies the image feature PCi(k) on the basis of the identified three-dimensional vector. As the image feature PCi(k), e.g. the sum of the values of the three components of the above-described three-dimensional vector or the average value thereof, the square root of sum of squares of the three components of the above-described three-dimensional vector, and so forth are cited. However, the image feature PCi(k) is not limited thereto.

Upon the end of S106, the partial region feature identifying section 40 checks whether or not the value of the variable i is 15 (S107). If it is checked that the value of the variable i is not 15 (S107: N), the partial region feature identifying section 40 increments the value of the variable i by one (S108) and executes the processing of S105 and the subsequent steps again. If it is checked that the value of the variable i is 15 (S107: Y), the partial region feature identifying section 40 ends the processing shown in the present processing example.

Figure 9:
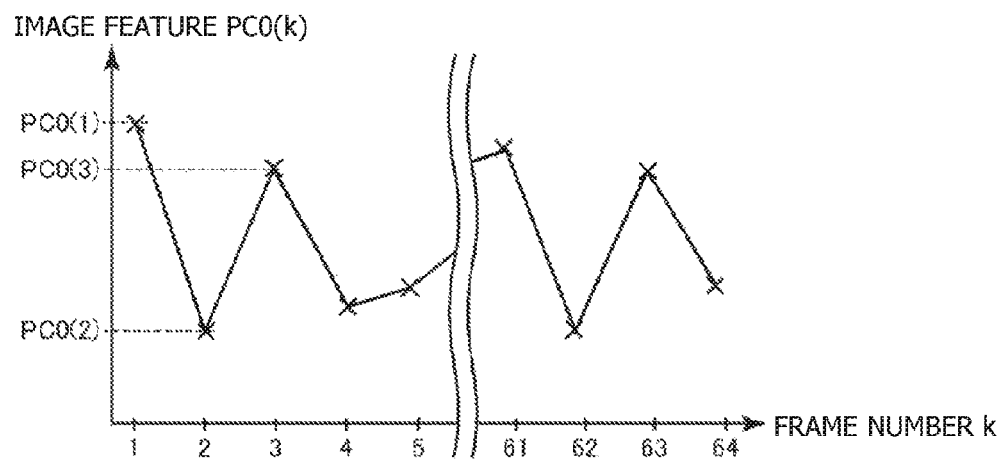
FIG. 9 is a diagram schematically showing one example of an image feature.

FIG. 9 is a diagram schematically showing one example of the image feature PC0(k) associated with the subject partial region SR0 in the frame image 20 of the frame number k. In the present embodiment, the information processing device 12 executes the processing shown in S101 to S108 about each frame image 20 taken in one contact determination period. Due to this, the image features PC0(1) to PC0(64), PC1(1) to PC1(64), . . . , and PC15(1) to PC15(64) are identified.

Figure 10:
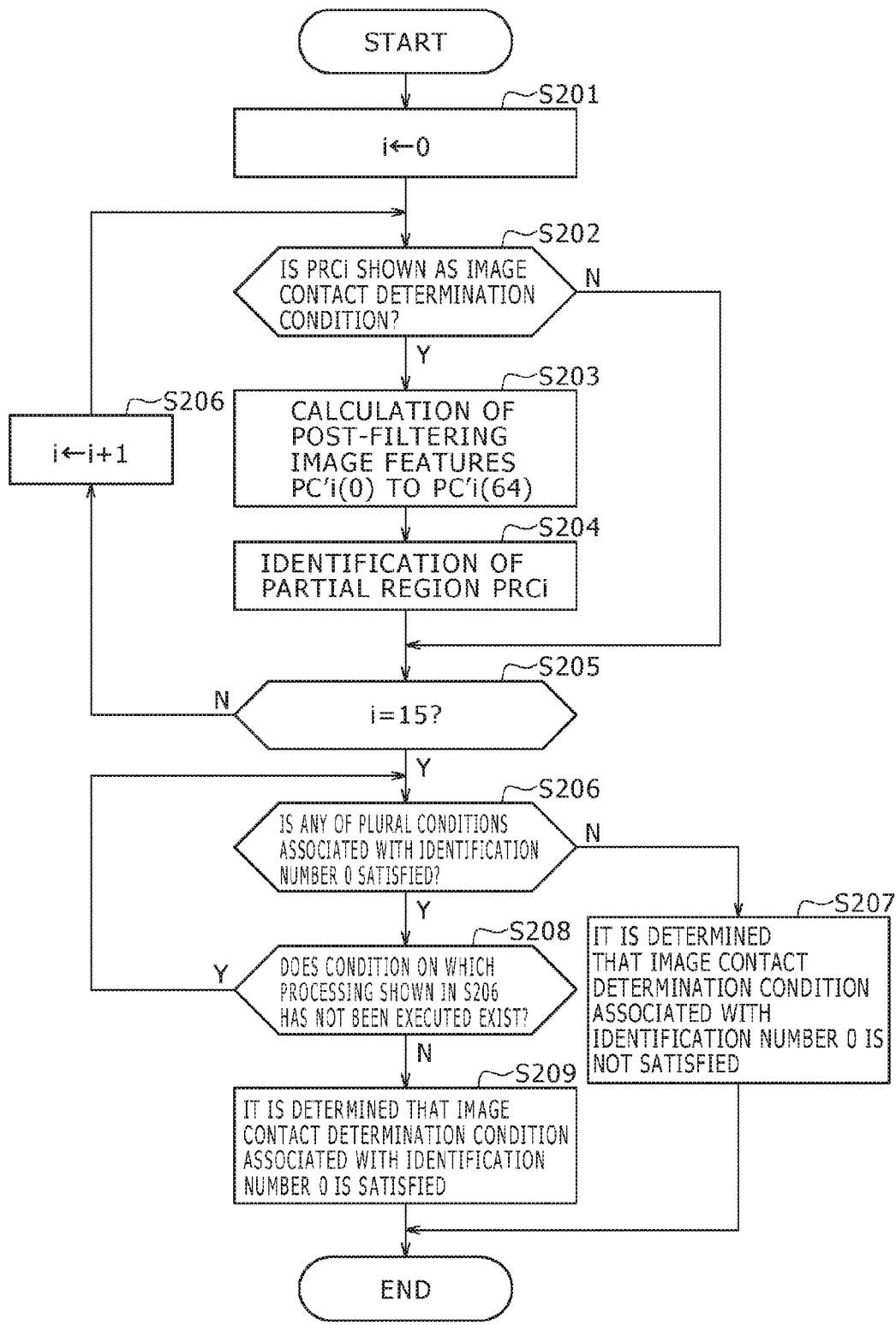
FIG. 10 is a flow diagram showing one example of the flow of processing executed in the information processing device according to the present embodiment.

In the following, one example of the flow of processing that is executed in the information processing device 12 according to the present embodiment when the image contact determination period ends and is to determine whether or not the frame images 20 taken in this image contact determination period satisfy the image contact determination condition will be described with reference to a flow diagram shown in FIG. 10. FIG. 10 shows one example of the flow of processing of determining whether or not the image contact determination condition that is associated with the subject partial region SR0 and is associated with the identification number 0 in the image contact determination condition data is satisfied.

First, the partial region feature identifying section 40 sets the value of the variable i to 0 (S201). Then, the partial region feature identifying section 40 checks whether or not the partial region feature PRCi is shown as any image contact determination condition included in the image contact determination condition data (S202).

Figure 11:
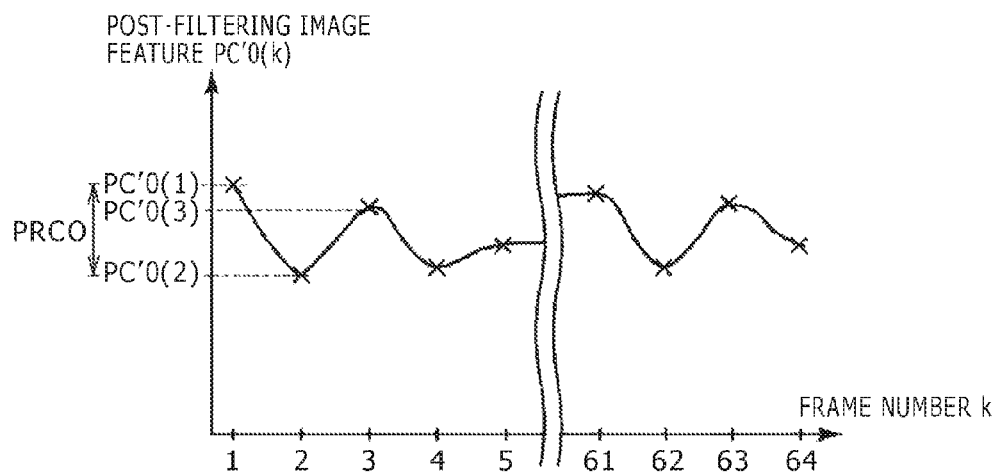
FIG. 11 is a diagram schematically showing one example of a post-filtering image feature.

If the partial region feature PRCi is shown (S202: Y), the partial region feature identifying section 40 calculates post-filtering image features PC'i(1) to PC'i(64) on the basis of the held image features PCi(1) to PCi(64) (S203). In the processing shown in S203, the partial region feature identifying section 40 regards the image features PCi(1) to PCi(64) as time-series data and carries out filtering by e.g. a band-pass filter on the image features PCi(1) to PCi(64). In this filtering, smoothing to remove components of higher frequencies than a predetermined frequency is carried out for example. In FIG. 11, one example of the post-filtering image feature PC'0($k$) associated with the subject partial region SR0 is schematically shown.

Then, the partial region feature identifying section 40 identifies the partial region feature PRCi associated with the subject partial region SRi on the basis of the post-filtering image features PC'i(1) to PC'i(64) calculated in the processing shown in S203 (S204). Here, the partial region feature identifying section 40 identifies the value of the partial region feature PRCi in such a manner that the partial region feature PRCi is a larger value when variation in the pixel value of the pixels included in the subject partial region SRi in the relevant contact determination period is larger. For example, the partial region feature identifying section 40 identifies the value obtained by subtracting the minimum value among PC'i(1) to PC'i(64) from the maximum value as the partial region feature PRCi.

Furthermore, if the partial region feature PRCi is not shown as any image contact determination condition included in the image contact determination condition data (S202: N) or if the processing shown in S204 ends, the partial region feature identifying section 40 checks whether or not the value of the variable i is 15 (S205). If it is checked that the value of the variable i is not 15 (S205: N), the partial region feature identifying section 40 increments the value of the variable i by one (S206) and executes the processing of S202 and the subsequent steps again.

If it is checked that the value of the variable i is 15 (S205: Y), the contact determining section 42 checks whether or not any of the plural conditions configuring the image contact determination condition associated with the identification number 0 in the image contact determination condition data is satisfied (S206). In the processing shown in S206, whether or not the condition is satisfied is checked about the condition on which the processing shown in S206 has not yet been executed. For example, whether or not the condition is satisfied is checked about any of conditions such as PRC0>PRC1, . . . , and PRC3>PRC2.

If it is checked that the condition is not satisfied in the processing shown in S206 (S206: N), the contact determining section 42 determines that the image contact determination condition associated with the identification number 0 is not satisfied (S207) and ends the processing shown in the present processing example.

On the other hand, if it is checked that the condition is satisfied in the processing shown in S206 (S206: Y), it is checked whether or not the condition on which the processing shown in S206 has not yet been executed exists among the plural conditions associated with the identification number 0 in the image contact determination condition data (S208). If the condition exists (S208: Y), the processing shown in S206 and the subsequent steps is executed again. If the condition does not exist (S208: N), the contact determining section 42 determines that the image contact determination condition associated with the identification number 0 is satisfied (S209) and ends the processing shown in the present processing example.

In the above manner, in the present embodiment, it is checked whether or not the relationship among the partial region features PRC0 to PRC15 satisfies all of the plural conditions associated with the identification number 0. In the present embodiment, also about the other identification numbers, similarly it is checked whether or not the relationship among the partial region features PRC0 to PRC15 satisfies all of the plural conditions associated with the identification number.

Figure 12:
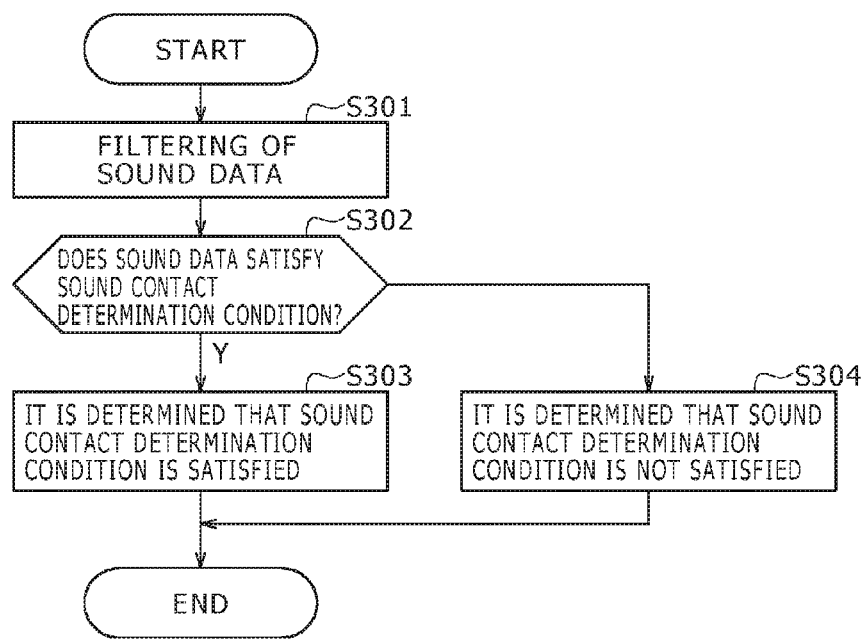
FIG. 12 is a flow diagram showing one example of the flow of processing executed in the information processing device according to the present embodiment.

In the following, one example of the flow of processing that is executed in the information processing device 12 according to the present embodiment when the sound contact determination period ends and is to determine whether or not sound data generated in this sound contact determination period satisfies the sound contact determination condition will be described with reference to a flow diagram shown in FIG. 12.

First, the contact determining section 42 executes filtering processing to extract a frequency region shown by sound contact determination condition data on sound data acquired by the sound data acquiring section 34 in the relevant sound contact determination period (S301). Then, the contact determining section 42 checks whether or not the post-filtering sound data satisfies the sound contact determination condition shown by the sound contact determination condition data (S302). In the processing shown in S302, the contact determining section 42 checks whether or not the maximum sound volume of the sound shown by the post-filtering sound data surpasses the magnitude of the sound volume shown by the sound contact determination condition data for example.

If it is checked that the maximum sound volume surpasses the sound volume shown by the data in the processing shown in S302 (S302: Y), the contact determining section 42 determines that the sound contact determination condition is satisfied (S303) and ends the processing shown in the present processing example. If it is checked that the maximum sound volume does not surpass the sound volume shown by the data in the processing shown in S302 (S302: N), the contact determining section 42 determines that the sound contact determination condition is not satisfied (S304) and ends the processing shown in the present processing example.

In the above manner, it is checked whether or not the generated sound data satisfies the sound contact determination condition.

Furthermore, as shown in FIG. 4, the contact determining section 42 identifies the period P3, during which the image contact determination period P1, about which it is determined that the image contact determination condition associated with the identification number i is satisfied, and the sound contact determination period P2, about which it is determined that the sound contact determination condition is satisfied, overlap. Then, the contact determining section 42 determines that the contact of an object with part of the subject appearing in the image occupying the subject partial region SRi is present in the identified period P3. For example, every sound contact determination period, the contact determining section 42 may determine whether or not the sound contact determination period satisfies a condition that this sound contact determination period is a period about which it is determined that the image contact determination condition associated with the identification number i is satisfied and it is determined that the sound contact determination condition is satisfied. Then, the contact determining section 42 may determine that the contact of an object with part of the subject appearing in the image occupying the subject partial region SRi is present in the sound contact determination period satisfying this condition.

In the above processing example, the contact determining section 42 determines whether the contact of an object with the subject is present or absent on the basis of the taken frame images 20 and the acquired sound data. However, the contact determining section 42 may determine whether the contact of an object with the subject is present or absent on the basis of either one. For example, the contact determining section 42 may determine that the contact of an object with part of the subject appearing in the image occupying the subject partial region SRi is present in the image contact determination period about which it is determined that the image contact determination condition associated with the identification number i is satisfied.

The possibility that images of the eyes of a subject appear in the images occupying the subject partial regions SR4 to SR7 is high. Therefore, there is a possibility that variation in the pixel value of the pixels included in the subject partial regions SR4 to SR7 becomes large due to a blink of the user as the subject without relation to the contact of an object with the subject. For this reason, in the example of FIG. 7, the partial region features PRC4 to PRC7 are excluded from the targets of comparison with the partial region feature PRC0 in the image contact determination conditions associated with the identification numbers 0 and 3.

Furthermore, the possibility is high that an image of an arm or a hand of a subject appears in the images occupying the subject partial regions SR4, SR8, and SR12 when a finger gets contact with part of the face appearing in the subject partial region SR0. Therefore, the possibility is high that variation in the pixel value of the pixels included in the subject partial regions SR4, SR8, and SR12 does not serve as a reference in determining whether the contact of a finger with part of the face appearing in the subject partial region SR0 is present or absent. For this reason, in the example of FIG. 7, the partial region features PRC4, PRC8, and PRC12 are excluded from the targets of comparison with the partial region feature PRC0 in the image contact determination condition associated with the identification number 0. On the other hand, the possibility is high that an image of an arm or a hand of a subject appears in the images occupying the subject partial regions SR7, SR11, and SR15 when a finger gets contact with part of the face appearing in the subject partial region SR3. For this reason, the partial region features PRC7, PRC11, and PRC15 are excluded from the targets of comparison with the partial region feature PRC3.

Furthermore, when an object gets contact with part of a subject appearing in the image occupying the subject partial region SR0, variation in the pixel value is larger in the pixels in the subject partial region SR0 than in the pixels in the other subject partial regions SR. Therefore, in the example of FIG. 7, that the partial region feature PRC0 is larger than all of the partial region features PRC other than the partial region features PRC excluded from the comparison targets is shown as the image contact determination condition associated with the identification number 0. Furthermore, for a similar reason, that the partial region feature PRC3 is larger than all of the partial region features PRC other than the partial region features PRC excluded from the comparison targets is shown as the image contact determination condition associated with the identification number 3.

Furthermore, the possibility is high that, when a finger gets contact with part of a face appearing in the image occupying the subject partial region SR0 or SR3, the face moves in association with this contact. Moreover, when a finger gets contact with part of a face appearing in the image occupying the subject partial region SR0, an image of the contour of the face appears in the images occupying the subject partial regions SR1 and SR3 with a higher possibility than in the image occupying the subject partial region SR2. Therefore, the possibility is high that variation in the pixel value of the pixels included in the subject partial regions SR1 and SR3 becomes larger than variation in the pixel value of the pixels included in the subject partial region SR2. On the other hand, when a user only pretends to bring a finger into contact with part of the face appearing in the image occupying the subject partial region SR0 and actually the finger does not get contact with the face, the possibility that the face moves is low. Thus, in this case, the possibility is high that the partial region feature PRC2 does not satisfy the condition that the partial region feature PRC2 is smaller than both the partial region features PRC1 and PRC3. For this reason, in FIG. 7, that the partial region feature PRC2 is smaller than both the partial region features PRC1 and PRC3 is further shown as the image contact determination condition associated with the identification number 0. For a similar reason, in FIG. 7, that the partial region feature PRC1 is smaller than both the partial region features PRC0 and PRC2 is further shown as the image contact determination condition associated with the identification number 3.

Figure 13:
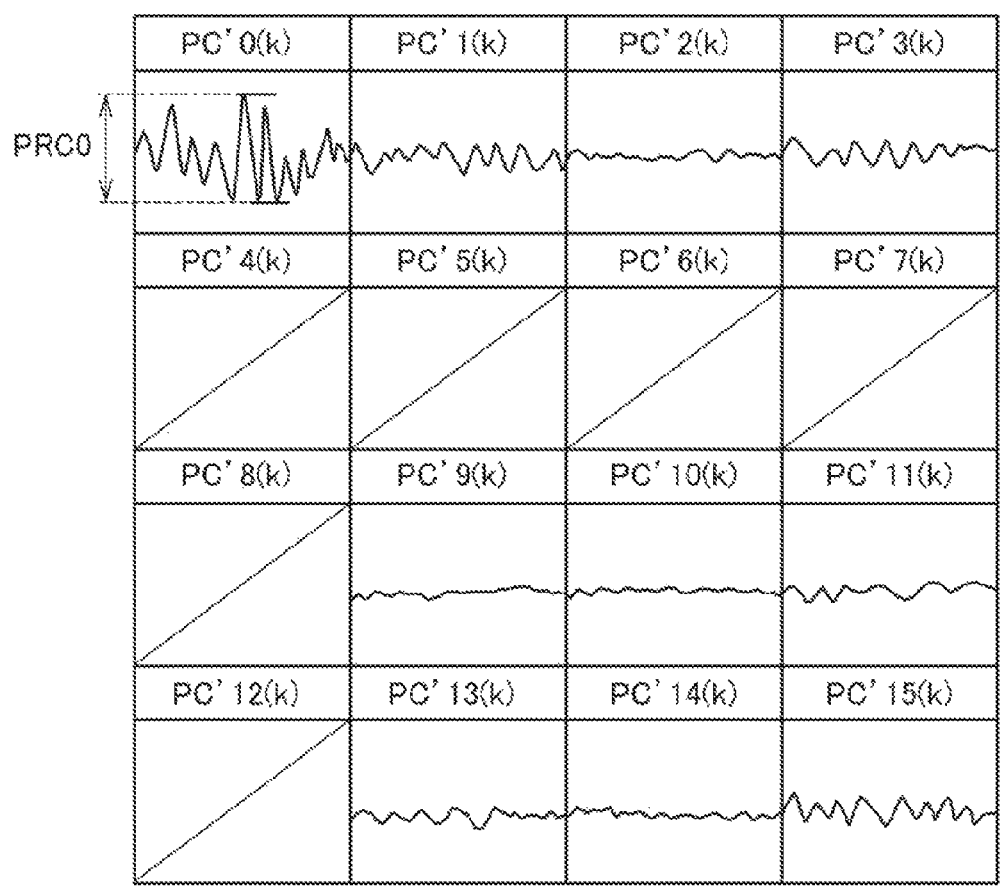
FIG. 13 is a diagram schematically showing one example of the post-filtering image features about plural subject partial regions.

In FIG. 13, one example of the post-filtering image features PC0'(k) to PC15'(k) about plural subject partial regions SR is schematically shown. Furthermore, the partial region feature PRC0 is also shown in FIG. 13. In FIG. 13, the post-filtering image features PC0'(k) to PC15'(k) corresponding to the image features PC shown as the image contact determination condition associated with the identification number 0 in FIG. 7 are shown.

For example, when the post-filtering image features PC0'(k) to PC15'(k) shown in FIG. 13 are calculated, the partial region feature PRC0 is larger than all of the partial region features PRC1 to PRC3, PRC9 to PRC11, and PRC13 to PRC15. Furthermore, the partial region feature PRC2 is smaller than both the partial region features PRC1 and PRC3. Thus, in this case, it is determined that the relationship among the partial region features PRC0 to PRC15 satisfies the image contact determination condition associated with the identification number 0 in the image contact determination condition data. Similarly, it is also possible to determine whether or not the other image contact determination conditions such as the image contact determination condition associated with the identification number 3 are satisfied.

In the present embodiment, whether the contact of an object with a subject is present or absent is determined on the basis of the relationship among the image features associated with plural positions and therefore the accuracy of detection of whether the contact of an object with a subject is present or absent is improved compared with conventional techniques.

Furthermore, in the present embodiment, it is determined whether the contact of an object with part of a subject appearing in the image occupying the subject partial region SR0 is present or absent on the basis of the relationship among the partial region features PRC1 to PRC3. In addition, it is determined whether the contact of an object with part of a subject appearing in the image occupying the subject partial region SR3 is present or absent on the basis of the relationship among the partial region features PRC0 to PRC2. As above, on the basis of the relationship among the partial region features PRC associated with plural subject partial regions SR different from a specific subject partial region SR, it is determined whether the contact of an object with part of a subject appearing in the image occupying this specific subject partial region SR is present or absent. In this manner, in the present embodiment, the accuracy of detection of whether the contact of an object with part of a subject appearing in the image occupying the relevant subject partial region SR is present or absent is improved compared with conventional techniques.

Furthermore, in the present embodiment, the sound contact determination period is shorter than the image contact determination period. Therefore, by combining the above-described determination based on the frame images 20 and the above-described determination based on sounds, the timing of the contact of an object with a subject can be identified with high accuracy.

Moreover, in the present embodiment, the position of the subject region R in the frame image 20 is identified and the partial region features PRC associated with positions in this subject region R are calculated. Then, on the basis of the relationship among the partial region features PRC thus calculated, whether the contact of an object with the subject is present or absent is determined. In this manner, in the present embodiment, whether the contact of an object with a subject is present or absent can be precisely detected even when the distance between the subject and the imaging device 14 and the position of the subject relative to the imaging device 14 change in a contact determination period.

In the above, determination of whether or not a user has brought a finger into contact with the face is mainly described. However, in the present embodiment, whether or not an arbitrary object such as a ball has gotten contact with the face can be determined similarly. Furthermore, whether or not an object has gotten contact with a subject other than the face can be determined similarly.

In some cases, in one contact determination period, the contact of an object with part of a subject appearing in the image occupying the subject partial region SR is determined about plural subject partial regions SR. In this case, the information processing device 12 may execute processing according to a combination of these plural subject partial regions SR.

The present invention is not limited to the above-described embodiment.

For example, the contact determining section 42 may determine whether the contact of an object with a subject is present or absent on the basis of the temporal anteroposterior relationship about change in the image feature shown by the partial region feature PRC associated with each of plural subject partial regions SR. In FIG. 14, another example of the post-filtering image features PC0'(k) to PC15'(k) about the plural subject partial regions SR is schematically shown. Furthermore, for example, the contact determining section 42 may identify the time when the value of the post-filtering image feature PC'i(k) (i=0, 1, 2, . . . , 15) becomes the maximum (here, frame number PTCi). In FIG. 14, PTC0, PTC3, PTC11, and PTC15 are exemplified. However, also about other post-filtering image feature PC'i(k), the time when the value thereof becomes the maximum (frame number PTCi) may be identified similarly. Furthermore, for example, an image contact determination condition showing the relationship among the frame numbers PTCi may be included in the image contact determination condition data. Specifically, for example, PTC0<PTC3, PTC0<PTC11, PTC0<PTC15, etc. may be included in the image contact determination condition data as part of the image contact determination condition. Furthermore, the contact determining section 42 may determine that the contact of an object with a subject is present if all conditions including these conditions are satisfied.

Furthermore, between the image contact determination period and the sound contact determination period, at least one of the period, the start timing, and the end timing may be identical. In addition, for example, the subject partial region SR does not need to be one region obtained by dividing the subject region R. For example, the subject partial regions SR may overlap with each other.

Furthermore, the information processing device 12 may be a portable game device including a camera and a microphone for example. Moreover, the information processing device 12 may be a personal computer, a tablet terminal, a smartphone, or the like. In addition, the allocation of roles to the information processing device 12, the imaging device 14, the sound collecting device 16, and the display device 18 is not limited to the above-described one. Furthermore, the information processing device 12 may be composed of plural chassis.

Moreover, the above-described specific character strings and the specific character strings in the drawings are exemplification and the present invention is not limited by these character strings.

The invention claimed is:

1. An information processing device comprising:
a frame image acquiring section configured to acquire a plurality of frame images that include a subject region in which an image of a subject appears and are taken at timings different from each other;
a subject partial region identifying section configured to identify, about each of the frame images, a plurality of subject partial regions that are each part of the subject region and are different from each other in a position in the subject region;
a partial region feature identifying section configured to identify partial region features showing variation in an image feature of an image occupying the subject partial region on the basis of the image feature of the image occupying each of the subject partial regions associated with each other in each of the frame images; and
a contact determining section configured to determine whether contact of an object with the subject is present or absent on the basis of a relationship among the partial region features each associated with a respective one of a plurality of the subject partial regions.

2. The information processing device according to claim 1, wherein
the contact determining section determines whether contact of an object with part of the subject appearing in the image occupying the subject partial region is present or absent on the basis of a relationship that is associated with the subject partial region and is a relationship among the partial region features each associated with a respective one of a plurality of the subject partial regions.

3. The information processing device according to claim 2, wherein
the contact determining section determines whether contact of an object with part of the subject appearing in the image occupying the subject partial region different from a plurality of the subject partial regions is present or absent on the basis of a relationship among the partial region features each associated with a respective one of the plurality of the subject partial regions.

4. The information processing device according to claim 1, wherein
the contact determining section determines whether contact of an object with the subject is present or absent on the basis of a magnitude relationship among degrees of variation in the image feature shown by the partial region features each associated with a respective one of a plurality of the subject partial regions.

5. The information processing device according to claim 1, wherein
the contact determining section determines whether contact of an object with the subject is present or absent on the basis of a temporal anteroposterior relationship about change in the image feature shown by the partial region feature associated with each of a plurality of the subject partial regions.

6. The information processing device according to claim 1, further comprising:
a sound data acquiring section that acquires sound data, wherein
the contact determining section determines whether contact of an object with the subject is present or absent on the basis of the relationship among the partial region features and the sound data that is acquired.

7. An information processing method comprising:
acquiring a plurality of frame images that include a subject region in which an image of a subject appears and are taken at timings different from each other;
identifying, about each of the frame images, a plurality of subject partial regions that are each part of the subject region and are different from each other in a position in the subject region;
identifying partial region features showing variation in an image feature of an image occupying the subject partial region on the basis of the image feature of the image occupying each of the subject partial regions associated with each other in each of the frame images; and
determining whether contact of an object with the subject is present or absent on the basis of a relationship among the partial region features each associated with a respective one of a plurality of the subject partial regions.

8. A non-transitory computer readable medium having stored therein a program for a computer, the program comprising:
by a frame image acquiring section, acquiring a plurality of frame images that include a subject region in which an image of a subject appears and are taken at timings different from each other;
by a subject partial region identifying section, identifying, about each of the frame images, a plurality of subject partial regions that are each part of the subject region and are different from each other in a position in the subject region;
by a partial region feature identifying section,
identifying partial region features showing variation in an image feature of an image occupying the subject partial region on the basis of the image feature of the image occupying each of the subject partial regions associated with each other in each of the frame images; and
a contact determining section, determining whether contact of an object with the subject is present or absent on the basis of a relationship among the partial region features each associated with a respective one of a plurality of the subject partial regions.

* * * * *